United States Patent
Beelitz et al.

(10) Patent No.: US 8,090,937 B2
(45) Date of Patent: Jan. 3, 2012

(54) SYSTEM AND METHOD FOR MANAGING BOOTING OF AN INFORMATION HANDLING SYSTEM

(75) Inventors: Alan Beelitz, Leander, TX (US); Jeremy Ziegler, Pflugerville, TX (US); Shree Dandekar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 993 days.

(21) Appl. No.: 11/934,317

(22) Filed: Nov. 2, 2007

(65) Prior Publication Data

US 2009/0119497 A1 May 7, 2009

(51) Int. Cl.
G06F 15/177 (2006.01)
(52) U.S. Cl. ............................ 713/2; 713/1
(58) Field of Classification Search .............. 713/1, 2, 713/100; 726/16, 17, 21
See application file for complete search history.

(56) References Cited

U.S. PATENT DOCUMENTS

| | | | |
|---|---|---|---|
| 5,541,991 A * | 7/1996 | Benson et al. | 726/28 |
| 5,944,820 A | 8/1999 | Beelitz | 713/1 |
| 6,032,239 A | 2/2000 | Beelitz | 711/173 |
| 6,041,395 A | 3/2000 | Beelitz | 711/173 |
| 6,161,178 A * | 12/2000 | Cromer et al. | 713/2 |
| 6,298,427 B1 | 10/2001 | Beelitz | 711/173 |
| 6,470,434 B1 | 10/2002 | Beelitz | 711/173 |
| 6,530,019 B1 * | 3/2003 | Carroll | 713/2 |
| 2002/0026571 A1 | 2/2002 | Rickey | 713/2 |
| 2003/0012114 A1 | 1/2003 | Larvoire et al. | 369/100 |
| 2004/0044886 A1 | 3/2004 | Ng et al. | 713/1 |
| 2004/0088692 A1 | 5/2004 | Stutton et al. | 717/168 |
| 2004/0153840 A1 | 8/2004 | Buchanan, Jr. et al. | 714/42 |
| 2005/0005197 A1 | 1/2005 | Chong et al. | 714/36 |
| 2006/0015732 A1 | 1/2006 | Liu | 713/176 |
| 2006/0031669 A1 | 2/2006 | Liang et al. | 713/100 |
| 2006/0041738 A1 | 2/2006 | Lai | 713/2 |
| 2006/0041740 A1 | 2/2006 | Hsu | 713/2 |
| 2006/0047940 A1 | 3/2006 | Chiu et al. | 713/2 |
| 2006/0149956 A1 | 7/2006 | Chang | 713/1 |
| 2006/0155988 A1 | 7/2006 | Hunter et al. | 713/164 |
| 2007/0038996 A1 * | 2/2007 | Ben-Yehuda et al. | 718/1 |

OTHER PUBLICATIONS

U.S. Patent Application Entitled "Multi-User Bios Authentication", Dailey et al., 14 pages, Dec. 20, 2005.
U.S. Patent Application Entitled "System for Registering and Initiating Pre-Boot Environment for Enabling Partitions", Dandekar et al., 19 pages, Aug. 7, 2006.

(Continued)

*Primary Examiner* — Thomas Lee
*Assistant Examiner* — Paul Yanchus, III
(74) *Attorney, Agent, or Firm* — Baker Botts L.L.P.

(57) ABSTRACT

Systems and methods for managing booting of an information handling system are disclosed. A method for managing the booting of an information handling system may include receiving user input for booting an information handling system to a first partition or a second partition. The user input may be used to determine whether the received user input is for booting to the first partition or to the second partition. In response to determining that the received user input is for booting to the second partition, a determination may be made whether the information handling system is authorized to boot to the second partition. In response to determining that the information handling system is authorized to boot to the second partition, the information handling system may be booted to the second partition. In response to determining that the information handling system is not authorized to boot to the second partition, the information handling system may be booted to the first partition.

20 Claims, 3 Drawing Sheets

OTHER PUBLICATIONS

U.S. Patent Application Entitled "System and Method to Enable an Event Timer in a Multiple Event Timer Operating Environment", Khatri et al., 21 pages, Oct. 11, 2006.

U.S. Patent Application Entitled "Method and System to Dynamically Boot to a Non-Visible Partition", Beelitz et al., 23 pages, Jun. 6, 2006.

U.S. Patent Application Entitled System and Method for Restoring a Master Boot Record in Association with Accessing a Hidden Partition, Beelitz et al., 25 pages, Jun. 13, 2006.

U.S. Appl. No. 09/012,196, Entitled "System and Method for Preparing a Computer Memory", Beelitz, pages, filed Jan. 23, 1998.

* cited by examiner

SYSTEM AND METHOD FOR MANAGING BOOTING OF AN INFORMATION HANDLING SYSTEM

TECHNICAL FIELD

The present disclosure relates in general to information handling systems, and more particularly managing booting of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To permit expanded functionality of information handling systems, manufacturers and users of information handling systems often create different partitions within storage resources associated with an information handling system. For example, having multiple storage partitions in an information handling system may allow for two or more operating systems to reside on a single information handling system. Accordingly, when initializing an information handling system, a user may choose to boot among multiple operating systems. As a specific example, one partition may include a Windows®-based operating system, while another may include the Linux® operating system. As another example, one partition may include a Windows®-based operating system, while another may include a special-purpose operating system located in a host-protected area (HPA) of a hard disk, such as MediaDirect®, produced and marketed by Dell, Inc. As a further example, one partition may include a general purpose operating system while another partition may include encrypted data that requires a particular authorization in order to access (e.g., secret data, copyright protected music or audio, etc.).

In certain instances, it is critical to limit access to one or more partitions, and prevent access to one partition while using an operating system residing in another partition. For example, if an information handling system includes a general-purpose operating system (e.g., Windows, Linux) on a first partition, and encrypted data on a second partition, it may be desirable to limit access to the second partition (e.g., by password and/or registration number).

In other instances, it may be desirable to require a boot into a particular partition. For example, copyright owners of many general purpose operating systems require user registration and/or assent to a software license (e.g., an End-User License Agreement or "EULA") governing use of the operating system. Accordingly, if such an operating system resides on a particular partition, it may be desirable to require a boot to the particular partition on the first system boot to ensure the user registers and/or accepts the EULA presented by the operating system. Otherwise, if the user is permitted to boot into a different partition, the user may be able to access licensed content residing in the first partition from an operating system for the second partition without the user having assented to the EULA. Accordingly, by allowing a user to access licensed content without assenting to a license agreement governing use of the content, a computer manufacturer may face legal liability from the licensor of the content.

SUMMARY

In accordance with the teachings of the present disclosure, the disadvantages and problems associated with ensuring information handling system boot to a particular partition have been substantially reduced or eliminated.

In accordance with one embodiment of the present disclosure, a method for managing the booting of an information handling system is provided. User input may be received for booting an information handling system to a first partition or a second partition. The user input may be used to determine whether the received user input is for booting to the first partition or to the second partition. In response to determining that the received user input is for booting to the second partition, a determination may be made whether the information handling system is authorized to boot to the second partition. In response to determining that the information handling system is authorized to boot to the second partition, the information handling system may be booted to the second partition. In response to determining that the information handling system is not authorized to boot to the second partition, the information handling system may be booted to the first partition.

In accordance with another embodiment of the present disclosure, an information handling system may include a processor, a memory communicatively coupled to the processor, and a storage resource communicatively coupled to the processor. The storage resource may include a first partition, a second partition, a program of instructions embodied in non-partitioned area of the storage resource, and a master boot record. When executed, the program of instructions may be configured to: determine whether a received user input is for booting to the first partition or the second partition, and in response to determining that that the received user input is for booting to the second partition, determine whether the information handling system is authorized to boot to the second partition. The master boot record may be configured to boot the information handling system to the first partition if the information handling system is not authorized to boot to the second partition boot the information handling system to the second partition if the information handling system is authorized to boot to the second partition.

In accordance with a further embodiment of the present disclosure, a method for managing the boot of an information handling system is provided. A program of instructions embodied in a non-partitioned area of a storage resource may determine whether the information handling system is authorized to access a partition of the storage resource in response to determining that the information handling system is not authorized to access the partition, access to the partition may be disabled. In response to determining that the information handling system is authorized to access the partition, access to the partition may be enabled.

In accordance with an addition embodiment of the present disclosure, a method for managing execution of operating systems on an information handling system is provided. User input for running a first virtual machine comprising a first operating system may be received. A determination may be made regarding whether the information handling system is authorized to execute the first operating system. In response to determining that the information handling system is authorized to execute the first operating system, the first virtual machine may be run. In response to determining that the information handling system is not authorized to execute the first operating system, a second virtual machine comprising a second operating system may be run.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
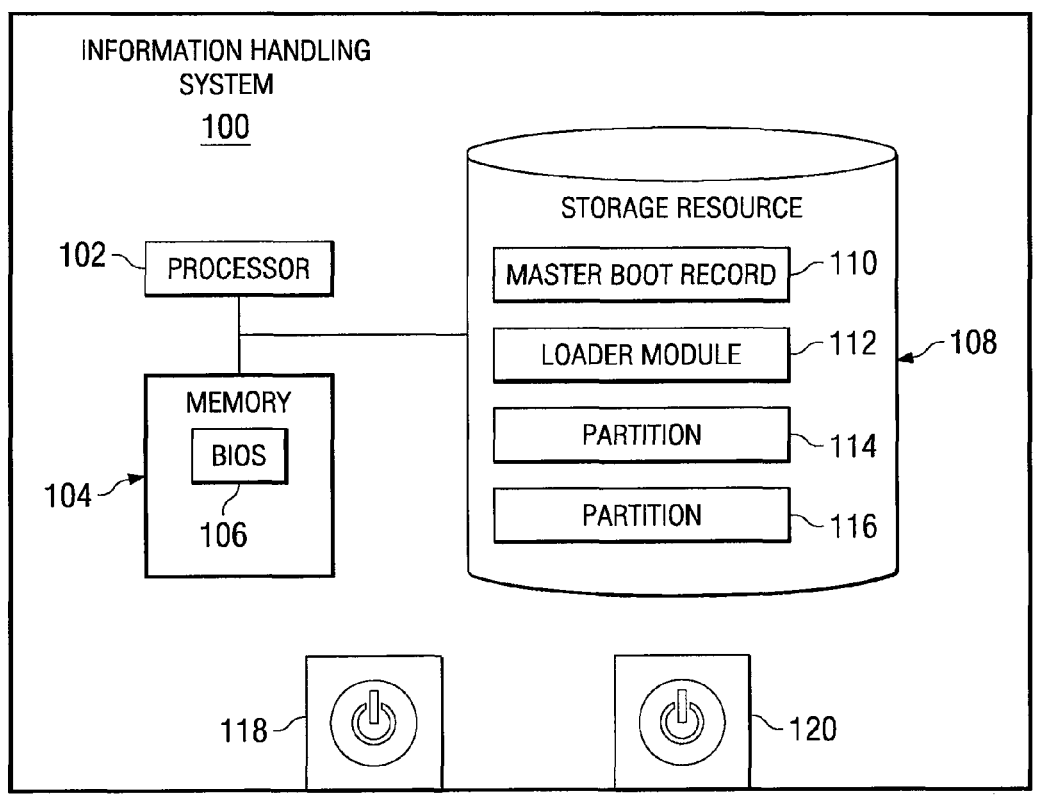
FIG. 1 illustrates a block diagram of an example information handling system, in accordance with the present disclosure.
Figure 2:
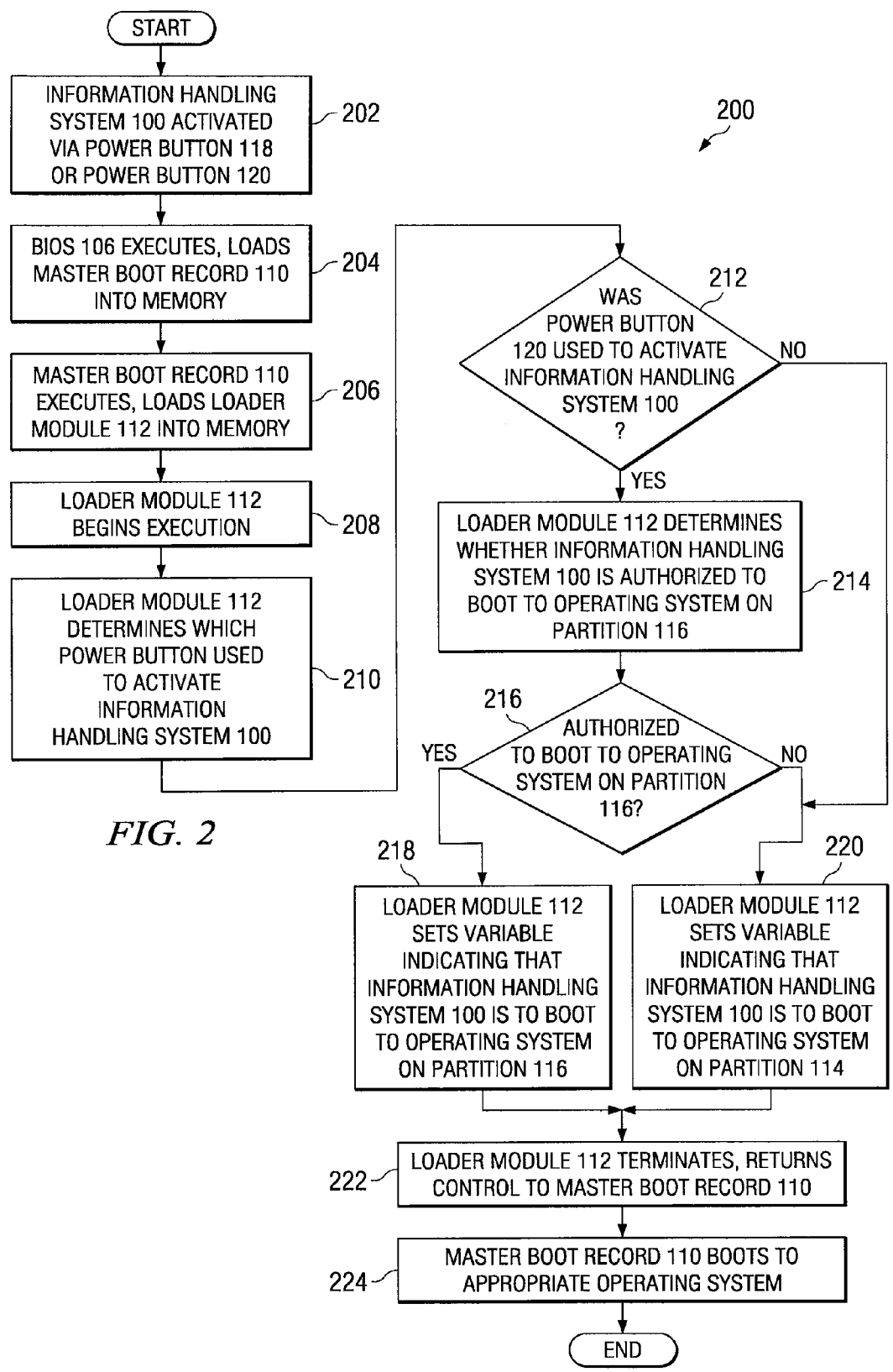
FIG. 2 illustrates a flow chart of an example method for managing booting of an information handling system, in accordance with the present disclosure.
Figure 3:
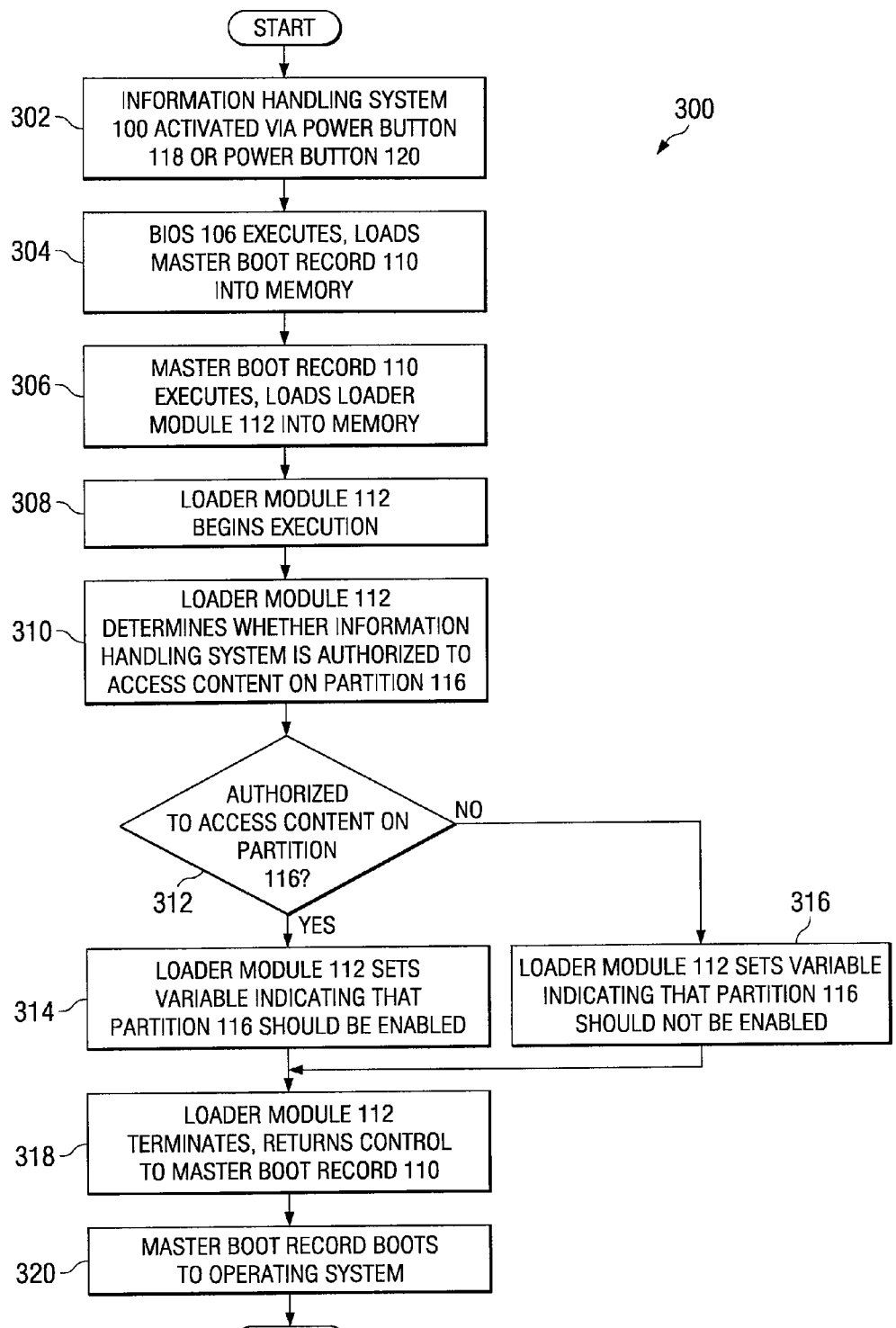
FIG. 3 illustrates a flow chart of an example method for enabling a partition of an information handling system, in accordance with the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example information handling system 100, in accordance with the present disclosure. As depicted in FIG. 1, information handling system 100 may comprise a processor 102, a memory 104 communicatively coupled to processor 102, a storage resource 108 communicatively coupled to processor 102 and memory 104, and one or more power buttons 118 and 120. In certain embodiments, information handling system 100 may comprise a server. In other embodiments, information handling system 100 may comprise a personal computer (e.g., a desktop computer, laptop computer, mobile computer, notebook computer, and/or handheld computer).

Processor 102 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104 and/or another component of information handling system 100. In the same or alternative embodiments, processor 102 may communicate data to and/or from storage resource 108 and/or another component of information handling system 100.

Memory 104 may be communicatively coupled to processor 102 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 100 is turned off. Memory 104 may include basic input/output system (BIOS) 106. BIOS 106 may include a set of instructions executed by processor 102 when information handling system 100 is powered on. In certain embodiments, BIOS 106 may be configured to identify and/or initiate components of information handling system 100 (e.g., storage resource 108 and/or other storage resources) and/or configure information handling system 100 so that software programs (e.g., an operating system) may load, execute and assume control of the PC, which may be known as "booting," "booting up" or "bootstrapping."

As discussed above, storage resource 108 may be coupled to processor 102 and memory 104. Generally speaking, storage resource 108 may comprise any system, device or apparatus generally operable to store data. Storage resource 108 may include a hard disk drive, magnetic tape library, optical disk drive, magneto-optical disk drive, compact disk drive, compact disk array, disk array controller, and/or any other computer-readable medium. As depicted in FIG. 1, storage resource 108 may include a master boot record (MBR) 110, a loader module 112, and one or more partitions 114, 116.

MBR 110 may include data and instructions that cooperate with BIOS 106 to boot information handling system 100, as described in greater detail below. In certain embodiments, MBR 110 may include a partition table that identifies one or more partitions comprising storage resource 108.

Loader module 112 may include data and instructions that cooperate with BIOS 106 and MBR 110 to boot information handling system 100, as described in greater detail below. In certain embodiments, the instructions and data included in loader module 112 may manage and/or control the initiation of software (e.g., operating systems) or access to data on one or more of partitions 114 and 116, also as described in greater detail below.

As is known in the art, partitioning of a storage resource may include the creation of logical divisions upon the storage resource. Accordingly, each of partition 114 and 116 may comprise a logical division of the storage space of storage resource 108. The creation of individual logical partitions on a storage resource may allow one to, among other things, apply operating system-specific logical formatting to the different partitions 114 and 116. Stated another way, partitioning storage resource 108 may allow storage resource 108 to behave such that each of partition 114, partition 116, and any other partition of storage resource 108 logically appear as independent non-partitioned storage resources, at least for some purposes. Partitioning storage resource 108 may allow the creation of several file systems on storage resource 108.

Creation of multiple file systems on a single storage resource may have many advantages. For example, creation of multiple file systems may permit the use of multi-booting, which allows for more than one operating system on information handling system 100. To illustrate, in a particular embodiment, partition 114 may include a Windows® operating system, while partition 116 may include another operating system (e.g., Linux, MacOS, or MediaDirect), thus allowing a user to boot into either the Windows® operating system of partition 114 or the other operating system of partition 116. In addition, partitioning may also allow higher levels of data organization, for example, by allowing separate partitions dedicated to multimedia and/or email mailboxes. Partitioning may also allow for segregation of data for security purposes, by permitting one to place insecure data on one partition and place secure data on another partition, perhaps encrypted.

Each of power button 118 and 120 may be configured to power on or power off information handling system 100. In the same or alternative embodiments, each of power button 118 and 120 may be configured to boot a particular operating system residing on a partition 114 or 116 associated with the particular power button. For example, a user may press power button 118 to power on information handling system 100 to boot an operating system residing on partition 114, and press power button 120 to power on information handling system 100 to boot an operating system residing on partition 116. Although FIG. 1 depicts each of power button 118 and 120 as push buttons, power buttons 118 and 120 may comprise any device, system or apparatus suitable to power on or actuate information handling system 100 (e.g., a switch).

In certain instances, it may be desirable to require information handling system 100 to boot into an operating system residing on a particular partition 114 or 116, despite a user's selection to boot into an operating system residing on another partition. For example, consider the scenario in which partition 114 includes a Windows® operating system and partition 116 includes another operating system, e.g., MediaDirect. In such a scenario, power button 118 may generally be operable to power on information handling system 100 and boot the Windows® operating system residing on partition 114, while power button 120 may generally be operable to power on information handling system 100 and boot MediaDirect residing on partition 116. In certain instances, particularly upon the first powering up of information handling system 100, it may be desirable to force information handling system 100 to boot to the Windows® operating system residing on partition 114, even if the user depresses power button 120, signaling the user's desire to boot MediaDirect residing on partition 116.

Reasons for requiring booting to the Windows® operating system residing on partition 114 may include ensuring that a user is presented with and agrees to the end-user license agreement (EULA) for Windows® and/or other licensed content residing on storage resource 108 before being able to access such content. Because a user may only be presented with and given the opportunity to agree to the EULA if booting into the Windows® operating system, copyright issues might be implicated if a user were permitted to boot to MediaDirect residing on partition 116 and access data stored on partition 114 (including the Windows® operating system and/or other licensed software) without first agreeing to the EULA governing the use of content on partitions 114 and/or 116. Consequently, in accordance with the present disclosure, loader module 112 may be configured to ensure that information handling system 100 boots to the Windows® operating system on partition 114, even if power button 120 associated with the operating system of partition 116 is depressed.

In addition, in certain instances it may be desirable to limit access to a particular partition 114 or 116. For example, consider the situation in which partition 114 includes a general purpose operating system (e.g., Windows®, Linux, MacOS), and partition 116 includes a multimedia library of audio and video files. Consider further that it is desired that a user of information handling system 100 register to use the multimedia library before accessing it. In such a scenario, it may be desirable to limit access to partition 116 including the multimedia files, e.g., by disabling partition 116 and enabling it once a user has properly registered. Consequently, in accordance with certain embodiments of the present disclosure, loader module 112 may be configured to enable partition 116 only if a user has booted into the operating system on partition 114 and properly registered for the copyrighted content of partition 116.

Although information handling system 100 is depicted as including one storage resource 108, it is understood that information handling system 100 may include any number of storage resources 108. For example, in some embodiments, information handling system 100 may include a plurality of storage resources 108. In such embodiments, partitions 114 and 116 may reside on different storage resources 108. In some embodiments, a plurality of storage resources 108 may be part of a storage array, e.g. a Redundant Array of Inexpensive Disks (RAID), whereby a plurality of storage resources 108 may appear to an operating system executing on information handling system 100 as a single logical storage unit or virtual storage resource. Accordingly, in certain embodiments, one or both of partitions 114, 116 may span over a plurality of physical storage resources 108. In addition, although storage resource 108 is depicted as including two partitions 114, 116, storage resource 108 may include any suitable number of partitions.

Although FIG. 1 depicts that storage resource 108 is disposed locally within information handling system 100, storage resource 108 may be communicatively coupled to processor 102 and/or memory 104 in any suitable manner. For example, in certain embodiments, storage resource 108 may be communicatively coupled to information handling system 100 via a network. Any such network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In the same or alternative embodiments, one or more storage resources 108 may be disposed within a storage enclosure configured to hold and power one or more storage resources 108. In such embodiments, such storage enclosures may be communicatively coupled to information handling system 100 and/or one or more of its components, in order to facilitate communication of data between storage resources 108 and at least one of processor 102 and/or memory 104.

Data may be transmitted among processor 102, memory 104, and storage resource 108 using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCI (SAS), any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof.

FIG. 2 illustrates a flow chart of an example method 200 for managing the boot of information handling system 100, in accordance with the present disclosure. In one embodiment, method 200 comprises determining whether information handling system 100 is authorized to boot into an operating system residing on partition 116, and if such authorization does not exist, booting into an operating system residing on partition 114.

According to one embodiment, method 200 preferably begins at step 202. As noted above, teachings of the present disclosure may be implemented in a variety of configurations of information handling system 100. As such, the preferred initialization point for method 200 and the order of the steps 202-224 comprising method 200 may depend on the implementation chosen.

At step 202, information handling system 100 may be activated or powered-on via a user depressing either power button 118 or power button 120. In the example method 200 depicted in FIG. 2, power button 118 may be associated with an operating system residing on partition 114, while power button 120 may be associated with an operating system residing on partition 116. Thus, if a user wishes to boot to the operating system residing on partition 114, the user may depress power button 118. Otherwise, if a user wishes to boot to the operating system residing on partition 116, the user may depress power button 120.

At step 204, BIOS 106 may begin executing in order to prepare information handling system 100 for loading an operating system. During execution, BIOS 106 may read MBR 110 from the first sector of storage resource 108 and load MBR 110 into memory 104. At step 206, MBR 110 may execute and read loader module 112 from non-partitioned space within storage resource 108 into memory 104. At step 208, loader module 112 may begin execution.

At step 210, loader module 112 may determine which power button 118, 120 was used at step 202 to activate information handling system 100. For example, loader module 112 may read from memory 104 a flag or variable set during activation of information handling system 100 that indicates whether information handling system 100 was powered on by power button 118 or power button 120.

At step 212, if it is determined that power button 120 was used to activate information handling system 100, method 200 may proceed to step 214, where a number of steps may be completed to determine whether information handling system 100 may be booted to the operating system residing on partition 116. Otherwise, if it is determined at step 212 that power button 118 was used to activate information handling system 100, method 200 may proceed to step 220 where a variable is set indicating that information handling system 100 should be booted to the operating system residing on partition 114.

At step 214, loader module 112 may determine whether information handling system 100 is authorized to boot to the operating system residing on partition 116. For example, loader module 112 may read from memory 104 and/or storage resource 108 a flag or variable that indicates whether information handling system 100 is authorized to boot to the operating system residing on partition 116. As discussed above, situations exist wherein it may be desirable to force information handling system 100 to boot to the operating system residing on partition 114, even when a user depresses power button 120, indicating the user's desire to boot to the operating system residing on partition 116. For example, if a user has not yet assented to an EULA governing the operating system residing on partition 114, it may be desirable to force a boot to partition 114, meaning boot to partition 116 is not authorized. Accordingly, information handling system 100 may be authorized to boot to partition 116 only after a user assents to the EULA. Thus, the flag or variable that loader module 112 may read to determine whether information handling system 100 is authorized to boot to the operating system residing on partition 116 may initially be set to a default value, indicating boot to partition 116 is not authorized, and then set to another value after a user assents to the EULA.

At step 216, if it is determined that information handling system 100 is authorized to boot to the operating system residing on partition 116, method 200 may proceed to step 218. Otherwise, if it is determined that information handling system 100 is not authorized to boot to the operating system residing on partition 116, method 200 may proceed to step 220.

At step 218, in response to a determination that information handling system 100 is authorized to boot to partition 116, loader module 112 may set a flag or variable in memory 104 or on storage resource 108 indicating that information handling system 100 is to boot to the operating system on partition 116.

At step 220, in response to a determination that information handling system 100 was activated by power button 118 (at step 212) or a determination that information handling system 100 is not authorized to boot to partition 116 (at step 218), loader module 112 may set a flag or variable in memory 104 or on storage resource 108 indicating that information handling system 100 is to boot to the operating system on partition 114.

At step 222, loader module 112 may terminate and return control of the boot process to MBR 110. At step 224, MBR 110 may boot to the operating system residing on partition 114 or the operating system residing on partition 116 based at least on the flags and/or variables set at either step 218 or step 220. After completion of step 224, method 200 may end.

Although FIG. 2 discloses a particular number of steps to be taken with respect to method 200, it is understood that method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 100 or any other system operable to implement method 200. In certain embodiments, method 200 may be implemented partially or fully in software embodied in tangible computer readable media.

Although method 200 as depicted in FIG. 2 addresses booting of an information handling system in which two operating systems exist on separate partitions, methods analogous to those depicted in method 200 may be used to manage boot among two or more information handling systems that do not reside on separate partitions. In addition, similar methods may be used to manage access to two or more different operating systems that may run within a virtualization layer on an information handling system.

To illustrate, generally speaking, machine virtualization allows for a abstraction layer known as a virtualization layer that allows two or more "virtual machines," each with heterogeneous operating systems, to run in isolation, but also side-by-side (e.g., simultaneously) on the same information handling system. Accordingly, situations may arise in which it is desirable to allow some of the operating systems to execute, but not others, until such time as a user takes a necessary action, such as assenting to an EULA. For example, an information handling system may be capable of executing a virtual machine running a Windows® operating system and executing a virtual machine running a Linux operating system. In such cases, it may be desirable to prevent a user of the information handling system from running the Linux virtual machine until such time as the user has assented to the EULA for the Windows® operating system. Accordingly, a method similar to method 200 may be used to provide assurance that a user has assented to the EULA before allowing execution of the Linux-based virtual machine.

FIG. 3 illustrates a flow chart of an example method 300 for enabling a partition 116 of an information handling system 100, in accordance with the present disclosure. In one embodiment, method 300 comprises determining whether information handling system 100 is authorized to access a particular partition 116, and if such authorization does exist, enabling that partition 116.

According to one embodiment, method 300 preferably begins at step 302. As noted above, teachings of the present disclosure may be implemented in a variety of configurations of information handling system 100. As such, the preferred initialization point for method 300 and the order of the steps 302-320 comprising method 300 may depend on the implementation chosen.

At step 302, information handling system 100 may be activated or powered-on via a user depressing either power button 118 or power button 120. At step 304, BIOS 106 may begin executing in order to prepare information handling system 100 for loading an operating system. During execution, BIOS 106 may read MBR 110 from the first sector of storage resource 108 and load MBR 110 into memory 104. At step 306, MBR 110 may execute, read loader module 112 from non-partitioned space within storage resource 108 into memory 104. At step 308, loader module 112 may begin execution.

At step 310, loader module 112 may determine whether information handling system 100 is authorized to access partition 116. For example, loader module 112 may read from memory 104 and/or storage resource 108 a flag or variable that indicates whether information handling system 100 is authorized to access partition 116. As discussed above, situations exist wherein it may be desirable to limit access to partition 116, for example when partition 116 includes multimedia and it is desirable to have a user of information handling system 100 register to use such multimedia before accessing it. In such an example, loader module 112 may determine whether such registration has occurred and, accordingly, whether access to partition 116 has been authorized. Thus, the flag or variable that loader module 112 may read to determine whether information handling system 100 is authorized to access partition 116 may initially be set to a default value, indicating access to partition 116 is not authorized, and then set to another value after a user registers for access to the content on partition 116.

At step 312, if it is determined that information handling system 100 is authorized to access partition 116, method 300 may proceed to step 314. Otherwise, if it is determined that information handling system 100 is not authorized access partition 116, method 300 may proceed to step 316.

At step 314, in response to a determination that information handling system 100 is authorized to access partition 116, loader module 112 may set a flag or variable in memory 104 or on storage resource 108 indicating that information handling system 100 may access partition 116.

At step 316, in response to a determination that information handling system 100 is not authorized to access partition 116, loader module 112 may set a flag or variable in memory 104 or on storage resource 108 indicating that information handling system 100 may not access partition 116.

At step 318, loader module 112 may terminate and return control of the boot process to MBR 110. At step 320, MBR 110 may boot to an operating system residing on partition 114 and, based on the flags and/or variables set at either step 314 or step 316, enable or disable access to partition 116. After completion of step 320, method 300 may end.

Although FIG. 3 discloses a particular number of steps to be taken with respect to method 300, it is understood that method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 100 or any other system operable to implement method 300. In certain embodiments, method 300 may be implemented partially or fully in software embodied in tangible computer readable media.

Using the methods and systems disclosed herein, problems associated conventional approaches to managing booting of information handling systems and controlling access to storage resource partitions may be improved, reduced or eliminated.

Although the present disclosure has been described in detail, it should be understood that various changes, substitutions, and alterations can be made hereto without departing from the spirit and the scope of the disclosure as defined by the appended claims.

What is claimed is:

1. A method for managing the boot of an information handling system comprising:
   receiving user input for booting an information handling system to a first partition or a second partition;
   determining whether the received user input is for booting to the first partition or to the second partition;
   in response to determining that the received user input is for booting to the second partition, determining, by a program of instructions, whether the information handling system is authorized to boot to the second partition, wherein the determination of whether the information handling system is authorized to boot to the second partition is based at least on whether access to content on the first partition is authorized;

in response to determining that the information handling system is authorized to boot to the second partition, booting the information handling system to the second partition; and in response to determining that the information handling system is not authorized to boot to the second partition, booting the information handling system to the first partition.

2. A method according to claim 1, further comprising:
in response to determining that the received user input is for booting to the first partition, booting the information handling system to the first partition.

3. A method according to claim 1, further comprising:
setting a variable indicating whether the information handling system is to boot to the first partition or the second partition; and
determining, by a master boot record, whether to boot the information handling system to the first partition or the second partition based at least on the variable.

4. A method according to claim 1, further comprising loading the program of instructions in a memory by a master boot record.

5. A method according to claim 1, wherein the determination of whether the information handling system is authorized to boot to the second partition is based on at least whether an end user license agreement associated with content residing on the first partition has been assented to.

6. A method according to claim 1, wherein the first partition includes a Windows operating system.

7. A method according to claim 6, wherein the second partition includes an operating system selected from the group consisting of MediaDirect, MacOS, and Linux.

8. An information handling system comprising:
a processor;
a memory communicatively coupled to the processor
a storage resource communicatively coupled to the processor, the storage resource including:
a first partition;
a second partition;
a program of instructions embodied in non-partitioned area of the storage resource and when executed configured to:
determine whether a received user input is for booting to the first partition or the second partition; and
in response to determining that that the received user input is for booting to the second partition, determine whether the information handling system is authorized to boot to the second partition, wherein the determination of whether the information handling system is authorized to boot to the second partition is based on at least whether access to content on the first partition is authorized; and
a master boot record configured to:
boot the information handling system to the first partition if the information handling system is not authorized to boot to the second partition; and
boot the information handling system to the second partition if the information handling system is authorized to boot to the second partition.

9. An information handling system according to claim 8, wherein the master boot record is further configured to booting the information handling system to the first partition if the received user input is for booting to the first partition.

10. An information handling system according to claim 8, wherein:

the program of instructions is further configured to set a variable indicating whether the information handling system is to boot to the first partition or the second partition; and
the master boot record is further configured to boot the information handling system to the first partition or the second partition based at least on the variable.

11. An information handling system according to claim 8, further comprising loading the program of instructions in a memory by the master boot record.

12. An information handling system according to claim 8, wherein the determination of whether the information handling system is authorized to boot to the second partition is based on at least whether an end user license agreement associated with content residing on the first partition has been assented to.

13. An information handling system according to claim 8, wherein the first partition includes a Windows operating system.

14. An information handling system according to claim 13, wherein the second partition includes an operating system selected from the group consisting of MediaDirect, MacOS, and Linux.

15. An information handling system according to claim 8, further comprising:
a first device communicatively coupled to the processor and configured to indicate that the received user input is for booting the information handling system to the first partition; and
a second device communicatively coupled to the processor and configured to indicate that the received user input is for booting the information handling system to the second partition.

16. A method for managing the boot of an information handling system comprising:
determining by a program of instructions embodied in a non-partitioned area of a storage resource whether the information handling system is authorized to access a first partition of the storage resource, wherein the determination of whether the information handling system is authorized to access the first partition is based on at least whether access to content on the second partition is authorized;
in response to determining that the information handling system is not authorized to access the first partition, disabling access to the first partition and booting the information handling system to a second partition of the storage resource; and
in response to determining that the information handling system is authorized to access the first partition, enabling access to the first partition and booting the information handling system to the first partition or the second partition.

17. A method according to claim 8, further comprising:
setting a variable indicating whether the information handling system is authorized to access the first or second partition; and
determining, by a master boot record, whether to boot the information handling system with the first or second partition enabled.

18. A method according to claim 8, further comprising loading the program of instructions in a memory by a master boot record.

19. A method according to claim 8, wherein the determination of whether the information handling system is authorized to access the first partition is based on at least whether the user has registered to access content residing on the second partition.

20. A method for managing execution of operating systems on an information handling system comprising:
   receiving user input for running a first virtual machine comprising a first operating system;
   determining whether the information handling system is authorized to execute the first operating system, wherein the determination of whether the information handling system is authorized to execute the first operating system is based on at least whether access to content associated with the second virtual machine is authorized;
   in response to determining that the information handling system is authorized to execute the first operating system, running the first virtual machine; and
   in response to determining that the information handling system is not authorized to execute the first operating system, running a second virtual machine comprising a second operating system.

* * * * *